(12) United States Patent
Srinivasan et al.

(10) Patent No.: US 11,062,087 B2
(45) Date of Patent: Jul. 13, 2021

(54) GENERATING SUMMARY CONTENT TUNED TO A TARGET CHARACTERISTIC USING A WORD GENERATION MODEL

(71) Applicant: Adobe Inc., San Jose, CA (US)

(72) Inventors: Balaji Vasan Srinivasan, Bangalore (IN); Kushal Chawla, Bengaluru (IN); Mithlesh Kumar, Gaya (IN); Hrituraj Singh, Amroha (IN); Arijit Pramanik, Kolkata (IN)

(73) Assignee: ADOBE INC., San Jose, CA (US)

( * ) Notice: Subject to any disclaimer, the term of this patent is extended or adjusted under 35 U.S.C. 154(b) by 32 days.

(21) Appl. No.: 16/262,655

(22) Filed: Jan. 30, 2019

(65) Prior Publication Data
US 2020/0242197 A1    Jul. 30, 2020

(51) Int. Cl.
*G06F 40/284* (2020.01)
*G06N 20/00* (2019.01)

(52) U.S. Cl.
CPC .......... *G06F 40/284* (2020.01); *G06N 20/00* (2019.01)

(58) Field of Classification Search
CPC ...... G06F 40/284; G06F 16/345; G06N 20/00
USPC .......................................................... 704/9
See application file for complete search history.

(56) References Cited

U.S. PATENT DOCUMENTS

| 9,813,731 B2 * | 11/2017 | Chaudhury | ............ H04N 19/14 |
| 10,178,396 B2 * | 1/2019 | Chaudhury | ............ G06T 7/215 |
| 10,409,898 B2 * | 9/2019 | Sharma | ................ G06F 16/345 |
| 10,534,854 B2 * | 1/2020 | Sharma | ............... G06N 3/0445 |
| 10,685,050 B2 * | 6/2020 | Krishna | ................ G06N 20/00 |
| 2020/0104635 A1 * | 4/2020 | Xu | ....................... G06K 9/6256 |

OTHER PUBLICATIONS

Blei et al., Latent Dirichlet Allocation, Journal of Machine Learning Research, vol. 3, Jan. 2003, pp. 993-1022.
Brownlee, A Gentle Introduction to Text Summarization, Deep Learning for Natural Language Processing, Available Online at: https://machinelearningmastery.com/gentle-introduction-text-summarization/, Nov. 29, 2017, 14 pages.
Dufour-Lussier et al., Text Adaptation using Formal Concept Analysis, International Conference on Case-Based Reasoning, Aug. 9, 2010, 16 pages.
Fan et al., Controllable Abstractive Summarization, Proceedings of the 2nd Workshop on Neural Machine Translation and Generation, Jul. 20, 2018, pp. 45-54.

(Continued)

*Primary Examiner* — Susan I McFadden
(74) *Attorney, Agent, or Firm* — Kilpatrick Townsend & Stockton LLP

(57) ABSTRACT

Certain embodiments involve tuning summaries of input text to a target characteristic using a word generation model. For example, a method for generating a tuned summary using a word generation model includes generating a learned subspace representation of input text and a target characteristic token associated with the input text by applying an encoder to the input text and the target characteristic token. The method also includes generating, by a decoder, each word of a tuned summary of the input text from the learned subspace representation and from a feedback about preceding words of the tuned summary. The tuned summary is tuned to target characteristics represented by the target characteristic token.

17 Claims, 8 Drawing Sheets

(56) References Cited

OTHER PUBLICATIONS

Gehring et al., A Convolutional Encoder Model for Neural Machine Translation, Facebook AI Research, Jul. 25, 2017, 13 pages.
Knight, An Algorithm Summarizes Lengthy Text Surprisingly Well, Artificial Intelligence / Machine Learning, Available Online at: https://www.technologyreview.com/s/607828/an-algorithm-summarizes-lengthy-text-surprisingly-well/, May 12, 2017, 10 pages.
Kundan et al., Generating Topic-Oriented Summaries Using Neural Attention, Proceedings of the 2018 Conference of the North American Chapter of the Association for Computational Linguistics: Human Language Technologies, vol. 1, Jun. 1-6, 2018, pp. 1697-1705.
Liu et al., Text Summarization with TensorFlow, Google AI Blog, Available Online at: https://ai.googleblog.com/2016/08/text-summarization-with-tensorflow.html, Aug. 24, 2016, 3 pages.
Nallapati et al., Abstractive Text Summarization using Sequence-to-sequence RNNs and Beyond, Proceedings of the 20th SIGNLL Conference on Computational Natural Language Learning, Available online at: http://aclweb.org/anthology/K/K16/K16-1028.pdf, Aug. 7-12, 2016, pp. 280-290.
Paetzold et al., LEXenstein: A Framework for Lexical Simplification, Proceedings of ACL-IJCNLP 2015 System Demonstrations, Jul. 26-31, 2015, pp. 85-90.
Roy et al., Automated Linguistic Personalization of Targeted Marketing Messages Mining User-Generated Text on Social Media, International Conference on Intelligent Text Processing and Computational Linguistics, 2015, pp. 203-224.
See et al., Get to the Point: Summarization with Pointer-Generator Networks, Conference: Proceedings of the 55th Annual Meeting of the Association for Computational Linguistics, vol. 1, Apr. 25, 2017, pp. 1073-1083.
Vaswani et al., Attention is all You Need, 31st Conference on Neural Information Processing Systems, 2017, pp. 1-11.
Wiseman et al., Sequence-to-Sequence Learning as Beam-Search Optimization, In Proceedings of the 2016 Conference on Empirical Methods in Natural Language Processing, Nov. 1-5, 2016, pp. 1296-1306.
Banerjee et al., Multi Document Abstractive Summarization Using ILP Based Multi Sentence Compression, Proceedings of the Twenty-Fourth International Joint Conference on Artificial Intelligence, 2015, pp. 1208-1214.
Berg-Kirkpatrick et al., Jointly Learning to Extract and Compress, Proceedings of the 49th Annual Meeting of the Association for Computational Linguistics (ACL), Jun. 19-24, 2011, pp. 481-490.
Chopra et al., Abstractive Sentence Summarization with Attentive Recurrent Neural Networks, Proceedings of NAACL-HLT, Association for Computational Linguistics, 2016, pp. 93-98.
Duchi et al., Adaptive Sub-Gradient Methods for Online Learning and Stochastic Optimization, Journal of Machine Learning Research, vol. 12, 2011, pp. 2121-2159.
Filippova, Multi-Sentence Compression: Finding Shortest Paths in Word Graphs, Proceedings of the 23rd International Conference on Computational Linguistics (Coling 2010), 2010, pp. 322-330.
Genest et al., Framework for Abstractive Summarization Using Text-to-Text Generation, In Workshop on Monolingual Text-To-Text Generation, Proceedings of the 49th Annual Meeting of the Association for Computational Linguistics, Jun. 24, 2011, pp. 64-73.
Gulcehre et al., Pointing the Unknown Words, Proceedings of the 54th Annual Meeting of the Association for Computational Linguistics (ACL), Aug. 7-12, 2016, pp. 140-149.
Hermann et al., Teaching Machines to Read and Comprehend, in Advances in Neural Information Processing Systems, 2015, pp. 1693-1701.
Krishna et al., Vocabulary Tailored Summary Generation, Proceedings of the 27th International Conference on Computational Linguistics (COLING), Aug. 20-26, 2018, pp. 795-805.
Nenkova et al., Automatic Summarization, Foundations and Trends in Information Retrieval, vol. 5, No.'s 2-3, 2011, pp. 103-233.
Niu et al., A Study of Style in Machine Translation: Controlling the Formality of Machine Translation Output, In Proceedings of the 2017 Conference on Empirical Methods in Natural Language Processing, Sep. 7-11, 2017, pp. 2814-2819.
Paulus et al., A Deep Reinforced Model for Abstractive Summarization, Published as a Conference Paper at ICLR 2018, 2018, pp. 1-13.
Rennie et al., Self-Critical Sequence Training for Image Captioning, In CVPR, vol. 1, No. 3, 2017, pp. 7008-7024.
Rush et al., A Neural Attention Model for Abstractive Sentence Summarization, In Conference on Empirical Methods in Natural Language Processing, Sep. 3, 2015, 11 pages.
Sutskever et al., Sequence to Sequence Learning with Neural Networks, in Advances in Neural Information Processing Systems, Dec. 14, 2014, pp. 3104-3112.
Tu et al., Modeling Coverage for Neural Machine Translation, Proceedings of the 54th Annual Meeting of the Association for Computational Linguistics (vol. 1: Long Papers), Aug. 7-12, 2016, pp. 76-85.
Wang et al., A Reinforced Topic-Aware Convolutional Sequence-to-Sequence Model for Abstractive Text Summarization, Proceedings of the Twenty-Seventh International Joint Conference on Artificial Intelligence (IJCAI-18), Available Online at: arXivpreprint arXiv:1805.03616, 2018, pp. 4453-4460.
Wang et al., Domain-Independent Abstract Generation for Focused Meeting Summarization, Proceedings of the 51st Annual Meeting of the Association for Computational Linguistics, vol. 1, Aug. 4-9, 2013, pp. 1395-1405.

\* cited by examiner

GENERATING SUMMARY CONTENT TUNED TO A TARGET CHARACTERISTIC USING A WORD GENERATION MODEL

TECHNICAL FIELD

This disclosure relates generally to machine-learning techniques. More specifically, but not by way of limitation, this disclosure relates to using a machine-learning text generation model to generate summary content tuned to a target characteristic.

BACKGROUND

Content creation and summarization of written communication is typically generated by computer-based methods tasked with varying the scope of written communication summaries to cater to targeted audiences or delivery channels. For example, the computer-based methods may alter summaries of articles with a particular slant toward a specific topic, toward a desired summary length, toward summary readability, toward a specific linguistic characteristic (e.g., simpler content, more descriptive content, etc.), or any combination thereof. Accordingly, each summary of an article, or other written communication, may be tuned by the computer-based methods to cover various target characteristics.

These existing computer-based methods to tune summaries to target characteristics involve summarization at a post-processing stage. That is, the existing computer-based methods involve tuning a previously generated summary to a specific target characteristic. Such methods are generally ineffective and also result in a loss of coherence of the original summary.

The challenges associated with automated post-processing tuning of summaries to the target characteristics limit an effectiveness of tuned summaries that are generated to target specific characteristics or audiences. That is, the inaccurate nature of post-processing tuning of the summaries limits generating tuned summaries to the target characteristics in an easily user comprehensible, efficient, accurate, and consistent manner. Moreover, a complexity associated with remediating the post-processed summaries into coherent summaries provides significant computer efficiency hurdles.

SUMMARY

Certain embodiments involve tuning summaries of input text to a target characteristic using a word generation model. For example, a method for generating a tuned summary using a word generation model includes generating a learned subspace representation of input text and a target characteristic token associated with the input text by applying an encoder to the input text and the target characteristic token. The method also includes generating, by a decoder, each word of a tuned summary of the input text from the learned subspace representation and from a feedback about preceding words of the tuned summary. The tuned summary is tuned to target characteristics represented by the target characteristic token.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
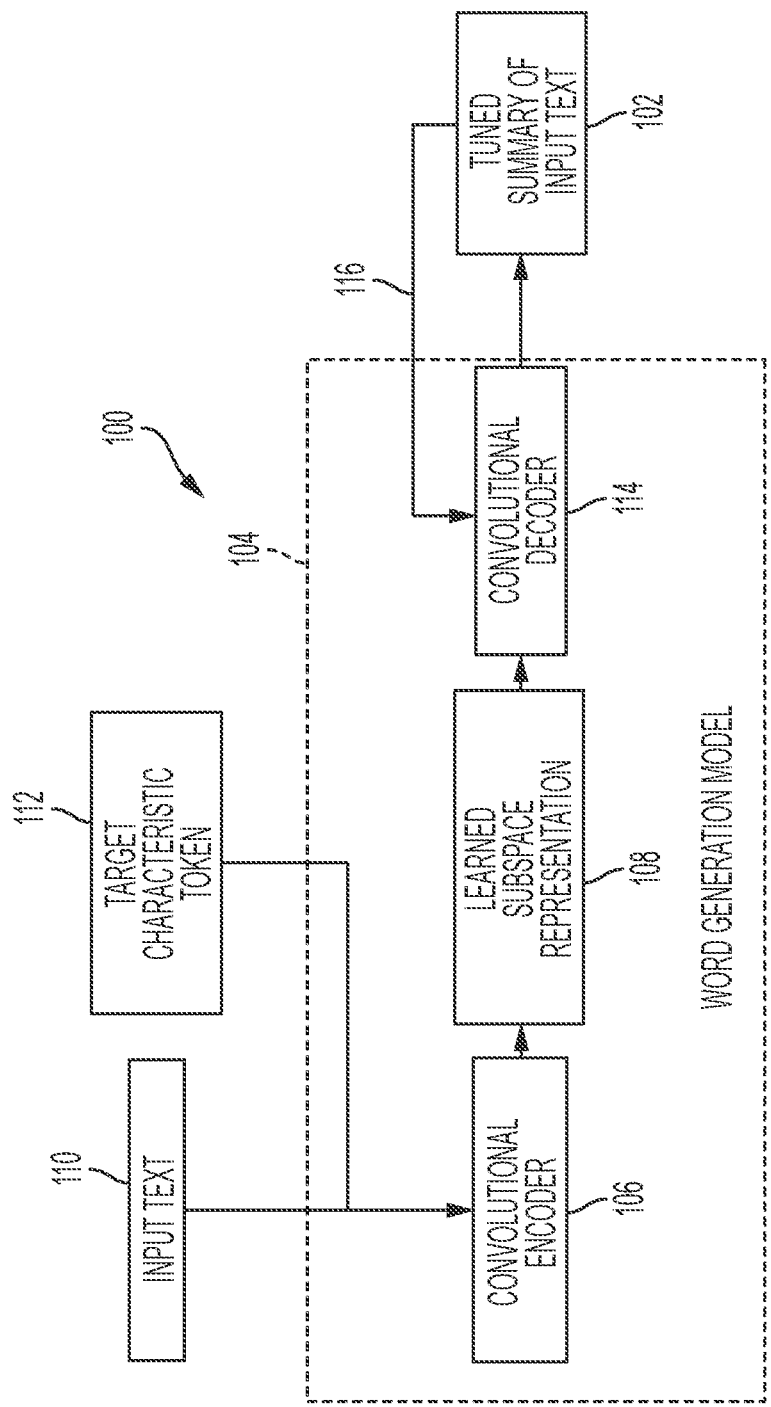
FIG. 1 depicts an example of a computing environment for generating a tuned summary of input text by a word generation model, according to certain embodiments of the present disclosure.

Certain embodiments of the present disclosure involve using a word generation model to generate a tuned summary of input text. As explained above, conventional solutions for summarizing text provide inefficient, inaccurate, unreliable tuned summaries, making these solutions unable to generate for a given set of input text. Certain embodiments described herein address this issue by, for example, automatically generating summaries of original input text (e.g., as opposed to the text summaries) tuned to a target characteristic, such as a specific topic, a desired summary length, summary readability, or a specific linguistic characteristic (e.g., simpler content, more descriptive content, etc.). That is, the tuned summaries are automatically generated from a word generation model directly from the input text rather than during a post-processing stage. For instance, a word generation model summarizes input text based on a target characteristic token provided to the word generation model along with the input text. By generating tuned summaries of the input text, the word generation model targets one or more characteristics of the input text or of output goals of the tuned summaries. This automatic generation of the tuned summaries provides an efficient and accurate mechanism to generate summaries tuned to target characteristics as compared to certain conventional solutions described above. Further, efficiently generating the tuned summaries of the input text enables systems to customize summaries toward any number of target characteristics that are closely associated with a targeted audience of the tuned summaries.

The following non-limiting example is provided to introduce certain embodiments. In this example, a computing system uses a word generation model to generate a tuned summary of input text. The word generation model is configured based on a learned subspace representation of the input text and a target characteristic token associated with the input text. The word generation model receives input text, such as an article or news story, and a target characteristic token at an encoder of the word generation model. The target characteristic token is prepended to the input text to indicate target characteristics for a tuned summary output of the word generation model. For example, the target characteristic token indicates a structural requirement of the summary (e.g., a length, active or passive voice, etc.), a content focus of the summary (e.g., sports, politics, etc.), an overall quality of the summary (e.g., based on reinforced learning of quality characteristic metrics), linguistic properties of the summary (e.g., descriptiveness of the summary, simplicity of the summary, etc.), or any combination thereof.

Continuing with this example, the encoder encodes the input text and the target characteristic token to generate a learned subspace representation of the input text and the target characteristic token. The learned subspace representation of the input text is a fixed-length vector that provides a succinct representation of the input text and the target characteristic token. In this manner, the learned subspace representation provides an indication of one or more target characteristics of the tuned summary as well as an indication of the input text that is summarized in the tuned summary.

The learned subspace representation of the input text and the target characteristic token are provided to a decoder of the word generation model. In the example, the decoder identifies the target characteristics of the target characteristic token. Based on the identified target characteristics, the decoder generates a tuned summary of the input text. For example, the tuned summary is tuned to the identified target characteristics represented by the target characteristic token. Each word of the tuned summary is generated using feedback about preceding words of the tuned summary. In this manner, the decoder tracks the previously decoded words to generate subsequent words that are both appropriate to the target characteristics identified in the target characteristic token and the overall coherence of the tuned summary. The resulting tuned summaries provide content tuned toward target audiences and targeted content of the original input text.

As used herein, the term "word generation model" is used to refer to a trained model that receives input text and a target characteristic token and generates a summary tuned to target characteristics identified by the target characteristic token. In an example, the word generation model includes a convolutional neural network based sequence-to-sequence framework.

As used herein, the term "target characteristic" is used to refer to a summary characteristic to which the summary generated by the word generation model is tuned. In an example, the target characteristic indicates a structural requirement of the summary (e.g., a length, active or passive voice, etc.), a content focus of the summary (e.g., sports, politics, etc.), an overall quality of the summary (e.g., based on reinforced learning of quality characteristic metrics), linguistic properties of the summary (e.g., descriptiveness of the summary, simplicity of the summary, etc.), or any combination thereof.

As used herein, the term "training data" is used to refer to data input to the word generation model to train the word generation model. In an example, the training data includes input text, a target characteristic token, and a ground truth summary based on the input text and a target characteristic represented by the target characteristic token.

As used herein, the term "learned subspace representation" is used to refer to an encoded representation of the input text and the target characteristic token. In an example, the learned subspace representation is used by a decoder of the word generation model to tune a summary of the input text to the identified target characteristics of the target characteristic token as an output of the word generation model.

Certain embodiments described herein facilitate generation of tuned summaries of input text directly from the input text using word-by-word summary generation and tuning. It is desirable to use computers to generate the tuned summaries of the input text. However, existing techniques for summarizing the input text at a post-processing stage sacrifice accuracy when tuning previously generated summaries to targeted characteristics. Accordingly, the existing techniques undercut an effectiveness of using a computer as a means to automatically generate a summary of the input text tuned to specific characteristic. To solve the issue of techniques undercutting the effectiveness of the computer, the presently described techniques facilitate generation of tuned summaries of the input text directly from the input text using word-by-word summary generation and tuning. These tuned summaries include target characteristics associated with a target audience or with targeted content of the input text. Thus, the tuned summaries are customizable based on target characteristics provided with the input text to the word generation model. Further, the generation of the tuned summaries directly from the input text in a word-by-word manner provides improvements to summary availability, accuracy, efficiency, and coherence of multiple different summaries generated for a single set of input text.

Example of an Operating Environment for a Word Generation Model

Referring now to the drawings, FIG. 1 depicts an example of a computing environment 100 for generating a tuned summary 102 of input text by a word generation model 104. The computing environment 100 also includes a convolutional encoder 106, which is executed by one or more computing devices to encode a learned subspace representation 108 from input text 110 and a target characteristic token 112. The word generation model 104 also includes a gated convolutional decoder 114 that decodes the learned subspace representation 108 to output the tuned summary 102 of the input text 110.

The word generation model 104 receives the input text 110 and the target characteristic token 112 at the convolutional encoder 106. In an example, the input text 110 includes a segment of text that a user would like summarized. Further, the target characteristic token 112 represents a characteristic to which the user would like the summary tuned. The target characteristics indicated by the target characteristic token 112 indicate a structural requirement of the summary (e.g., a length, active or passive voice, etc.), a content focus of the summary (e.g., sports, politics, etc.), an overall quality of the summary (e.g., based on reinforced learning of quality characteristic metrics), linguistic properties of the summary (e.g., descriptiveness of the summary, simplicity of the summary, etc.), other summary characteristics, or any combination thereof.

The convolutional encoder 106 encodes the input text 110 and the target characteristic token 112 to generate the learned subspace representation 108 of the input text 110. In an example, the word generation model 104 learns characteristic-specific subspaces into which the input text 110 is encoded as the learned subspace representation 108. In such an example, encoding the input text to the learned subspace representation 108 is based on the target characteristic token 112. To generate the learned subspace representation 108, the convolutional encoder 106 takes in a sequence of words from the input text 110 and generates an encoded sequence of the same length that is represented by the learned subspace representation 108. The convolutional decoder 114 then uses the learned subspace representation 108 to generate the tuned summary 102 of the input text 110 that is tuned to focus on the target characteristics identified by the target characteristic token 112. Further, the convolutional decoder 114 also relies on a feedback loop 116 that provides feedback about previously generated words output as the tuned summary 102 of the input text 110 to determine appropriate subsequent words from the convolutional decoder 114. That is, because the tuned summary 102 of the input text 110 is generated in a word-by-word manner, the convolutional decoder 114 may leverage the previously decoded words when generating a subsequent word of the tuned summary 102 of the input text 110.

Examples of Generating a Tuned Summary

Figure 2:
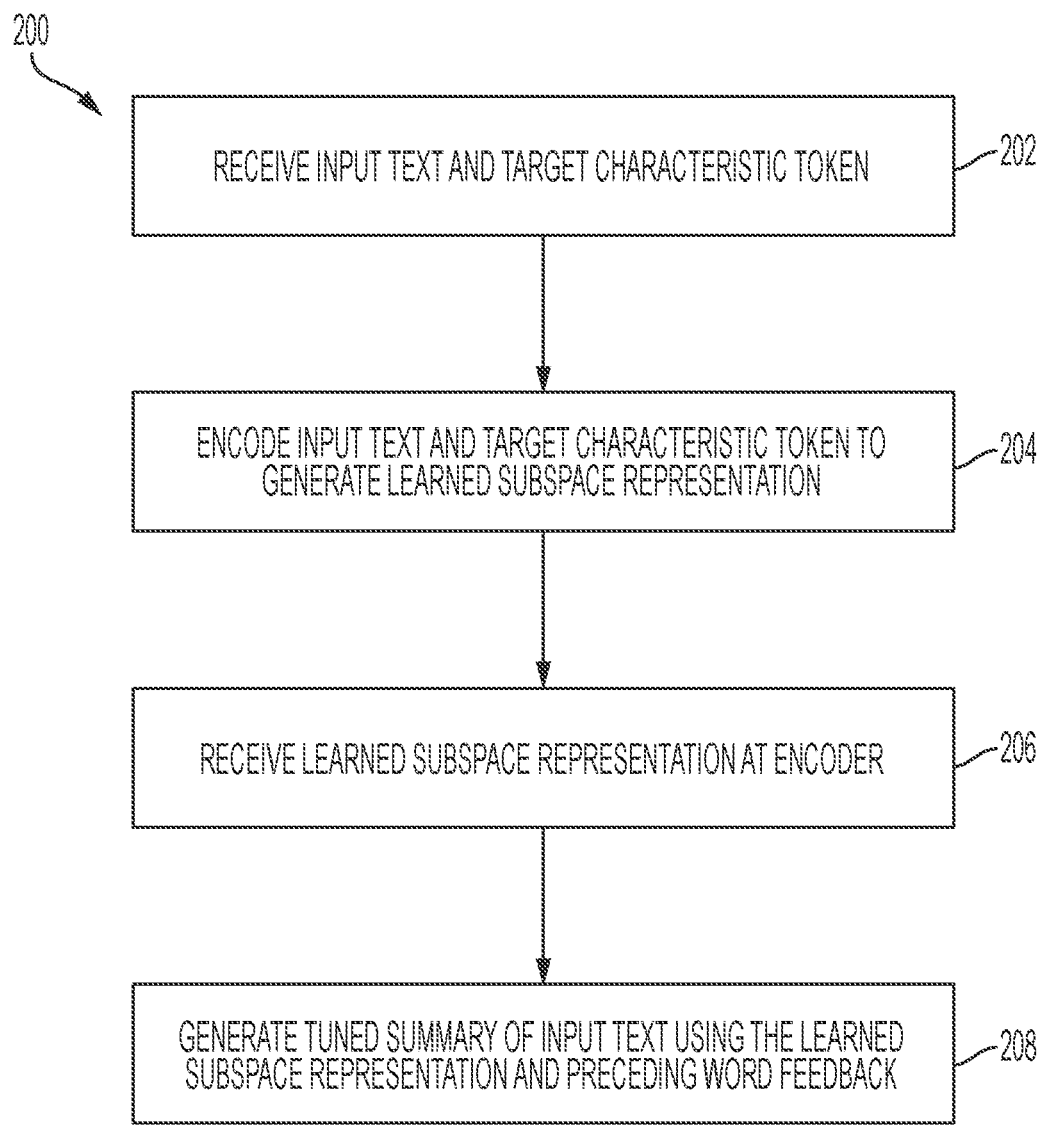
FIG. 2 depicts an example of a process for using the word generation model of FIG. 1 to generate the tuned summary of input text, according to certain embodiments of the present disclosure.

FIG. 2 depicts an example of a process 200 for using the word generation model 104 to generate the tuned summary 102 of the input text 110. One or more processing devices implement operations depicted in FIG. 2 by executing suitable program code (e.g., the word generation model 104). For illustrative purposes, the process 200 is described with reference to certain examples depicted in the figures. Other implementations, however, are possible.

At block 202, the process 200 involves receiving the input text 110 and the target characteristic token 112 at the word generation model 104. One or more processing devices execute the word generation model 104 (or suitable other program code) to implement block 202. For instance, executing the word generation model 104 causes one or more processing devices to receive or otherwise access the input text 110 and the target characteristic token 112 that are stored in a non-transitory computer-readable medium. In some embodiments, receiving or accessing the input text 110 and the target characteristic token 112 involves communicating, via a data bus, suitable signals between a local non-transitory computer-readable medium and the processing device. In additional or alternative embodiments, receiving or accessing the input text 110 and the target characteristic token 112 involves communicating, via a data network, suitable signals between a computing system that includes the non-transitory computer-readable medium and a computing system that includes the processing device. Examples of the input text 110 include text segments from news articles, scholarly publications, emails, or any other segments of text where a targeted summary of the input text 110 is desirable. In an example, the target characteristic token 112 is an identifier prepended to the input text 110 prior to receipt of the input text 110 and the target characteristic token 112 at the word generation model 104. In such an example, the target characteristic token 112 provides an indication of a target characteristic to which the tuned summary 102 of the input text 110 output by the word generation model 104 should focus.

At block 204, the process 200 involves encoding the input text 110 and the target characteristic token 112 using the convolutional encoder 106 to generate the learned subspace representation 108 of the input text 110 and the target characteristic token 112. One or more processing devices execute the convolutional encoder 106 (or other suitable program code) to implement block 204. In an example, the input text 110 and the target characteristic token 112 are encoded into the learned subspace representation of the input text 110 and the target characteristic token 112. In such an example, the learned subspace of the input text 110 and the target characteristic token 112 is a fixed-length vector that represents all of the text of the input text 110 and an indication of the target characteristics identified by the target characteristic token 112.

At block 206, the process 200 involves receiving the learned subspace representation 108 at the convolutional decoder 114. One or more processing devices execute the word generation model 104 (or other suitable program code) to implement block 206. In an example, the word generation model 104 provides the learned subspace representation 108 to the convolutional decoder 114. For example, the word generation model 104 causes one or more processing devices to receive or otherwise access the learned subspace representation 108 that is stored in a non-transitory computer-readable medium associated with the word generation model 104. In some embodiments, receiving or accessing the learned subspace representation 108 involves communicating, via a data bus, suitable signals between a local non-transitory computer-readable medium and the processing device. In additional or alternative embodiments, receiving or accessing the learned subspace representation 108 involves communicating, via a data network, suitable signals between a computing system that includes the non-transitory computer-readable medium and a computing system that includes the processing device.

At block 208, the process 200 involves generating the tuned summary 102 of the input text 110 by the convolutional decoder 114 using the learned subspace representation 108 and a preceding word feedback provided by the feedback loop 116. One or more processing devices execute the convolutional decoder 114 (or other suitable program code) to implement block 208. The learned subspace representation 108 is decoded word-by-word as the tuned summary of the input text 110 that is tuned to the target characteristics indicated by the target characteristic token 112. In an example, the word-by-word generation of the tuned summary of the input text 110 is accomplished by the convolutional decoder 114 using a probability distribution of future words based on a combination of the learned subspace representation 108, which accounts for the input text 110 and the target characteristic token 112, and the words of the tuned summary 102 generated so far, as provided by the feedback loop 116.

Figure 3:
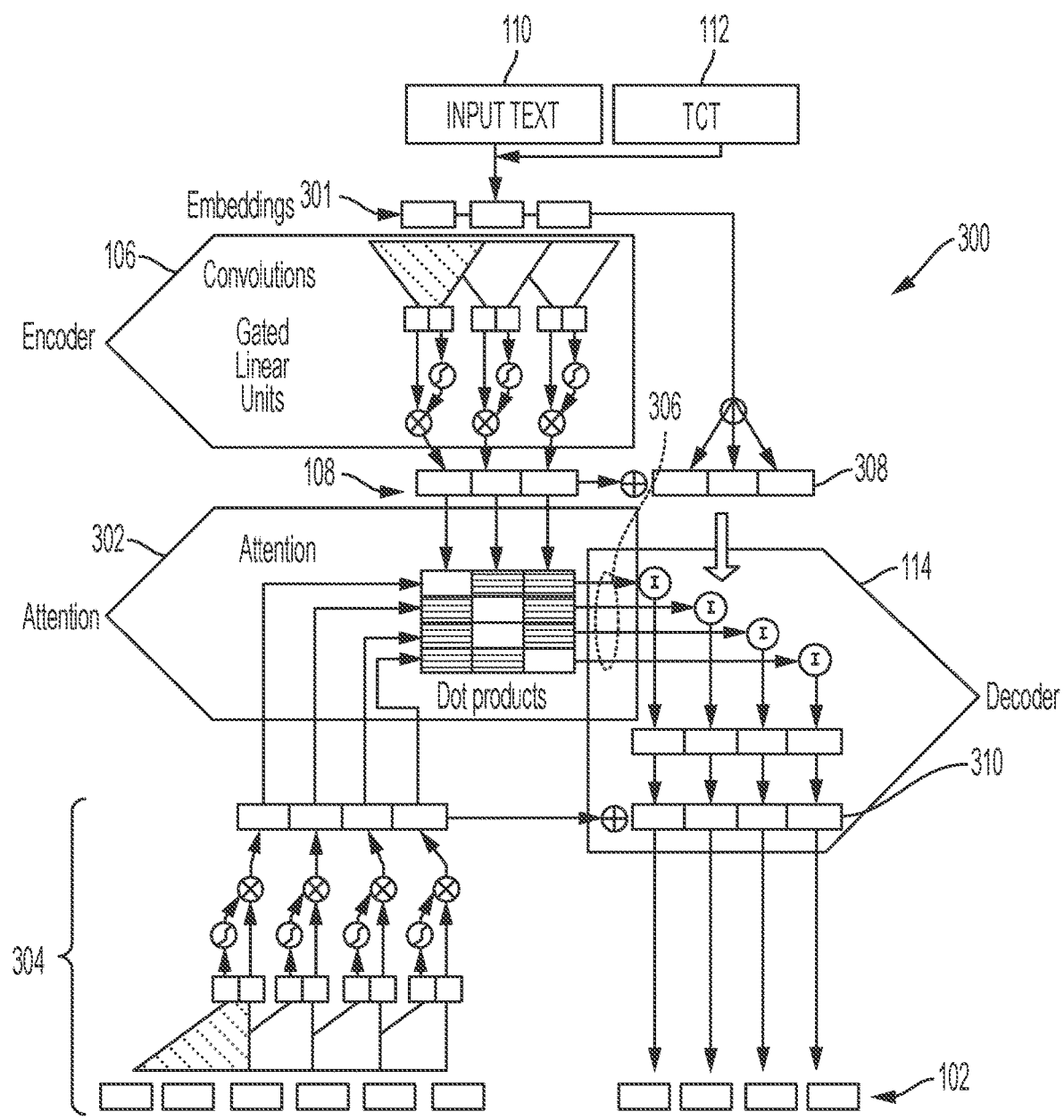
FIG. 3 depicts an example of a diagram of a convolutional neural network based sequence-to-sequence framework of the word generation model of FIG. 1, according to certain embodiments of the present disclosure.

FIG. 3 depicts an example of a diagram of a convolutional neural network (CNN) based sequence-to-sequence framework 300 of the word generation model 104. In the framework 300, each word of the input text 110 and the target characteristic token 112 is mapped to an embedding value 301. In an example, the embedding value 301 is a vector representation of the words included in the input text 110 and the target characteristic token 112. The embedding value 301 is received at the convolutional encoder 106. Examples of the input text 110 include text segments from any number of sources, such as newspapers, magazines, online articles, emails, etc.

The convolutional encoder 106 encodes the input text 110 and the target characteristic token 112 into the learned subspace representation 108. In examples of certain categories of target characteristics, the framework 300 learns characteristic-specific subspaces to which the input text 110 is encoded based on the target characteristic token 112 received by the encoder 106. For example, a target characteristic token 112 indicating that a summary should be short in length and tuned to politics may include a characteristic-specific subspace representative of the target characteristics (e.g., short in length and tuned to politics) of the target characteristic token 112.

The learned subspace representation 108, in an example, is fed into an attention distribution block 302. The attention distribution block 302 performs an operation on the learned subspace representation 108 to direct attention of the word generation model 104 to specific parts of the input text 110 to improve tuning of the tuned summary 102 to the target characteristics identified by the target characteristic token 112. For example, a dot product is performed on the learned subspace representation 108 and an attention distribution vector 304 to generate an attention distribution output 306. The attention distribution output 306 is combined with a modulo-2 adder representation 308 of the learned subspace representation 108 and the embedding value 301 at the convolutional decoder 114. At the convolutional decoder 114, the tuned summary 102 is generated in a word-by-word fashion based on the attention distribution output 306 and the modulo-2 adder representation 308 of the input text 110. In one or more examples, the tuned summary 102 is also modified based on the attention distribution vector 304 through a modulo-2 adder representation at a layer 310 of the convolutional decoder 114. In such an example, certain target characteristics identified by the target characteristic token 112 are tuned based on such a modification.

The generate the learned subspace representation 108, the convolutional encoder 106 receives a sequence of words $w_i$ from the input text 110. From the sequence of words $w_i$, an encoded sequence $z_i^L$ of the same length is generated as the learned subspace representation 108 of the input text 110. L indicates an encoder layer of the convolutional encoder 106 that generates the learned subspace representation 108. The convolutional decoder 114 uses the learned subspace representation 108 to generate the tuned summary 102 of the input text 110 while paying greater attention (e.g., using the attention distribution block 302) to different portions of the input text 110.

In an example, an output of an $l^{th}$ decoder block is represented by $h^l = (h_1^l, h_2^l, \ldots, h_n^l)$. The convolutional neural network of the convolutional decoder 114 also includes residual connections of the convolutional decoder 114, and the output of the convolutional decoder 114 is represented by the following equation:

$$h_i^l = v\left(W^l\left[h_{i-\frac{k}{2}}^{l-1}, \ldots, h_{i+\frac{k}{2}}^{l-1}\right] + b_w^l\right) + h_i^{l-1} \quad \text{(Equation 1)}$$

where $h_i^l$ is the output of the $l^{th}$ decoder block of the convolutional decoder 114, i is a timestep, v, W, and b are trainable parameters, and k is a width of a kernel. Additionally, a next word generated by the convolutional decoder 114 is represented by the following equation:

$$p(y_{i+1}|y_1, \ldots, y_i, x) = \text{softmax}(W_0 h_i^L + b_0) \in \mathbb{R}^T \quad \text{(Equation 2)}$$

where y is a word in the sequence and $W_0$ and $b_0$ are both trainable parameters. Every layer l of the convolutional decoder 114 additionally computes the attention over the input text 110 using the following equation:

$$a_{ij}^l = \frac{\exp(d_i^l \cdot z_j^u)}{\sum_{t=1}^{m} \exp(d_i^l \cdot z_t^u)}, d_i^l = W_d^l h_i^l + b_d^l + g_i \quad \text{(Equation 3)}$$

where $g_i$ is an embedding of a previous token, $d_i^l$ represents an $i^{th}$ state of an $l^{th}$ layer of the convolutional decoder 114 while predicting the next token, $a_{ij}^l$ is the attention to be paid to the $j^{th}$ source token in the $l^{th}$ layer at the $i^{th}$ state, and $z_j^u$ is a final encoder layer representation of the $j^{th}$ source token. Using the attention $a_{ij}^l$, a context vector is computed using the following equation:

$$c_i^l = \sum_{j=1}^{m} a_{ij}^l (z_j^u + e_j) \quad \text{(Equation 3)}$$

where $c_i^l$ is the context vector for the $l^{th}$ layer at the $i^{th}$ state, and $e_j$ is the $j^{th}$ input embedding of the source token.

In an example, the context vector $c_i^l$ is concatenated with a corresponding output $h_i^l$ of the convolutional decoder 114. The final tuned summary 102 of the input text 110 is generated by decoding output of the convolutional decoder 114 using a beam search that is optimized using a negative log likelihood ($L_{nll}$) of reference summaries associated with training input text. To generate text tuned to various target characteristics for the tuned summary 102, different portions of the framework 300 are modified to tune the tuned summary 102 to the varying target characteristics identified by the target characteristic token 112.

While the present application describes generation of the tuned summary 102 using the CNN-based sequence-to-sequence framework 300, other frameworks may also be used to generate the tuned summary 102 without departing from the techniques described herein. For example, the framework may include a long short-term memory (LSTM) encoder-decoder network. Other frameworks are also contemplated.

Examples of Training a Word Generation Model

Figure 4:
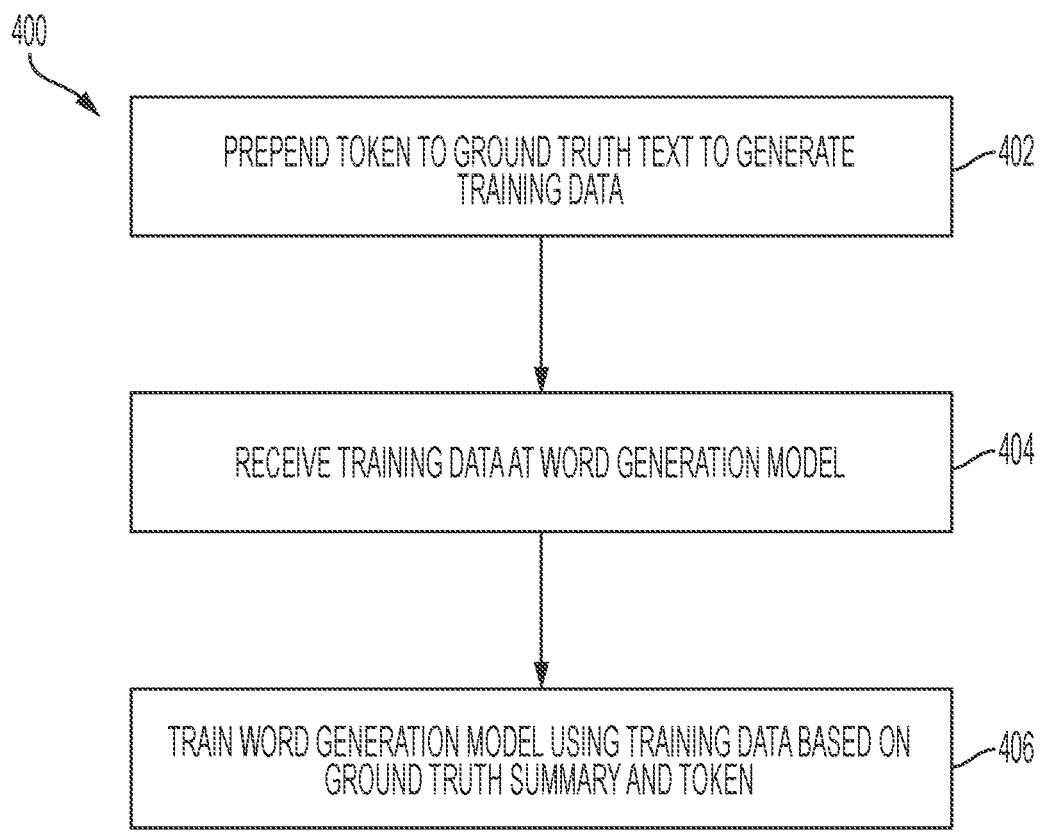
FIG. 4 depicts an example of a process for training the word generation model of FIG. 1 based on a ground truth summary of training data and a token associated with the ground truth summary, according to certain embodiments of the present disclosure.

FIG. 4 is an example of a process 400 for training the word generation model 104 based on a ground truth summary of training data and a token associated with the ground truth summary. Various target characteristics rely on training of the word generation model 104 by observing training data input and modifying structures of the output of the word generation model 104 to tune the output to the target characteristics. In an example, some target characteristics are easily identifiable by the word generation model 104. For example, a length of a tuned summary may be sufficiently distinguishable by the word generation model 104 in the training data. Accordingly, the word generation model 104 may differentiate between varying lengths of the tuned summaries to train the word generation model 104 to similarly generate the identified length characteristics. For illustrative purposes, the process 400 is described with reference to certain examples depicted in the figures. Other implementations, however, are possible.

At block 402, the process 400 involves prepending a token to a ground truth text input to generate training data. One or more processing devices execute the word generation model 104 (or suitable other program code) to implement block 402. Examples of the ground truth text input include text segments from news articles, scholarly publications, emails, or any other segments of text where a ground truth summary is already established. The word generation model 104 prepends the ground truth text input with the token to identify a characteristic represented by the ground truth summary. For example, the ground truth summaries that fit within a "short summary" target characteristic category will correspond with a "short summary" token prepended to a ground truth text input associated with the ground truth summary. In an example, the target characteristic token 112 is an identifier prepended to the input text 110 prior to receipt of the input text 110 and the target characteristic token 112 at the word generation model 104. In such an example, the target characteristic token 112 provides an indication of a target characteristic on which the tuned summary 102 of the input text 110 output by the word generation model 104 should focus.

At block 404, the process 400 involves receiving the training data at the word generation model 104. One or more processing devices execute the word generation model 104 (or other suitable program code) to implement block 404. For instance, executing the word generation model 104 causes one or more processing devices to receive or otherwise access the training data that is stored in a non-transitory computer-readable medium. In some embodiments, receiving or accessing the training data involves communicating, via a data bus, suitable signals between a local non-transitory computer-readable medium and the processing device. In additional or alternative embodiments, receiving or accessing the training data involves communicating, via a data network, suitable signals between a computing system that includes the non-transitory computer-readable medium and a computing system that includes the processing device.

At block 406, the process 400 involves training the word generation model 104 using the training data based on the ground truth summary and the token. One or more processing devices execute the word generation model 104 (or other suitable program code) to implement block 406. For instance, if a "short summary" is prepended to the ground truth text, the word generation model 104 is trained to generate a tuned output summary 102 that matches the ground truth summary associated with the token and the ground truth text. In an example, this process is repeated for a number of ground truth text inputs, tokens, and ground truth summaries of varying styles and lengths to train the word generation model 104 to output tuned summaries that correspond to structural characteristics of the tuned summary (e.g., summary length, active or passive voice, or other structural characteristics recognizable by the word generation model 104).

Figure 5:
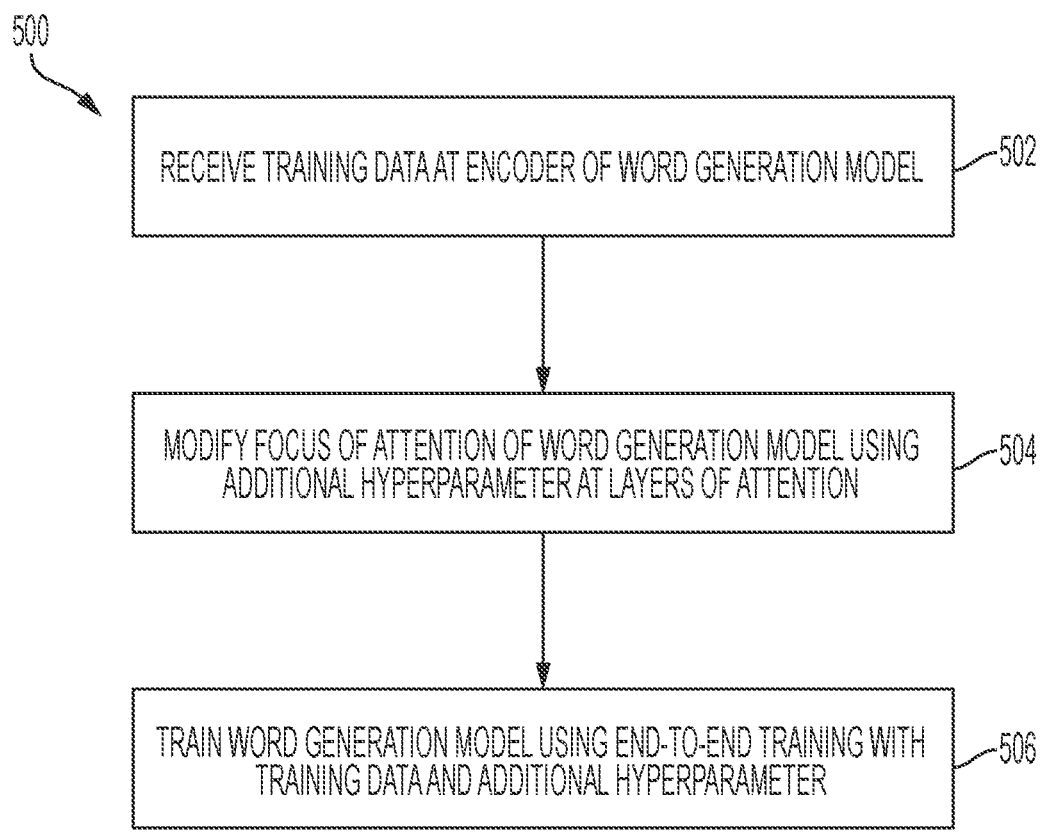
FIG. 5 depicts an example of a process for training the word generation model of FIG. 1 using end-to-end training with training data and an additional hyperparameter, according to certain embodiments of the present disclosure.

FIG. 5 is an example of a process 500 for training the word generation model 104 using end-to-end training with training data and an additional hyperparameter. Tuning the tuned summaries 102 toward content based target characteristics may rely on the word generation model 104 focusing on specific portions of the input text 110 when generating the tuned summaries 102. For example, a user may desire that the tuned summaries 102 be tuned to certain content based target characteristics. To tune the tuned summaries 102 toward the specified content based target characteristics, the attention distribution block 302 is trained to focus only on portions of the input text 110 that are relevant to the content based target characteristics.

Accordingly, at block 502, the process 500 involves receiving the training data at the convolutional encoder 106 of the word generation model 104. One or more processing devices execute the word generation model 104 (or other suitable program code) to implement block 502. For instance, executing the word generation model 104 causes one or more processing devices to receive or otherwise access the training data that is stored in a non-transitory computer-readable medium. In some embodiments, receiving or accessing the training data involves communicating, via a data bus, suitable signals between a local non-transitory computer-readable medium and the processing device. In additional or alternative embodiments, receiving or accessing the training data involves communicating, via a data network, suitable signals between a computing system that includes the non-transitory computer-readable medium and a computing system that includes the processing device.

At block 504, the process 500 involves modifying a focus of attention of the word generation model using an additional hyperparameter β at layers of the attention distribution block 302. One or more processing devices execute the word generation model 104 (or other suitable program code) to implement block 504. This adjustment to the attention distribution block 302 is represented in the following equation:

$$a_{ij}^l = \frac{\exp(d_i^l \cdot z_j^u \cdot \beta_j)}{\sum_{t=1}^{m} \exp(d_i^l \cdot z_t^u \cdot \beta_j)} \quad \text{(Equation 4)}$$

where $\beta_j = (1 + \delta_{topic})$ if the content based target characteristic token belonged to the targeted topic, or 1 otherwise. In this example, $\delta_{topic}$ determines a level of tuning for the topic.

At block 506, the process 500 involves training the word generation model 104 using end-to-end training with the training data and the additional hyperparameter β. One or more processing devices execute the word generation model 104 (or other suitable program code) to implement block 506. In an example, the end-to-end training involves determining suitable values for the hyperparameter β such that the tuned summary 102 results in a coherent summary of the input text 110 that is focused on the topic words associated with the content based target characteristic. The end-to-end training with the hyperparameter β provides that the model does not entirely focus on topic words but also focuses attention on other relevant parts of the content to generate a coherent output.

Figure 6:
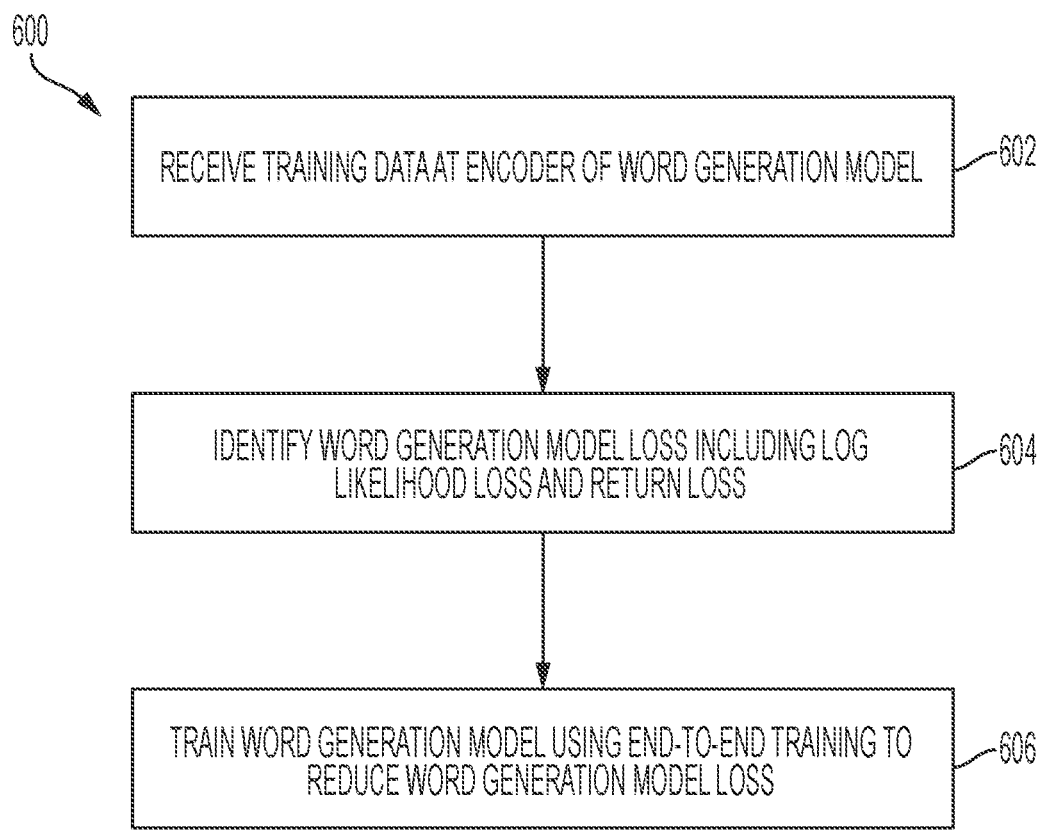
FIG. 6 depicts an example of a process for training the word generation model of FIG. 1 using end-to-end training to reduce word generation model losses, according to certain embodiments of the present disclosure.

FIG. 6 is an example of a process 600 for training the word generation model 104 using end-to-end training to reduce losses associated with the word generation model 104. In an example, a target characteristic of the tuned summary 102 includes having the tuned summary 102 target qualitative characteristics (e.g., increasing readability, increasing information coverage, etc.). For example, the word generation model 104 uses standard metrics of the qualitative characteristics in a reinforcement learning setup to achieve an appropriate level of tuning that reduces loss associated with the word generation model 104 when tuning the tuned summary 102 to the qualitative characteristics.

At block 602, the process 600 involves receiving the training data at the convolutional encoder 106 of the word generation model 104. One or more processing devices execute the word generation model 104 (or other suitable program code) to implement block 602. For instance, executing the word generation model 104 causes one or more processing devices to receive or otherwise access the training data that is stored in a non-transitory computer-readable medium. In some embodiments, receiving or accessing the training data involves communicating, via a data bus, suitable signals between a local non-transitory computer-readable medium and the processing device. In additional or alternative embodiments, receiving or accessing the training data involves communicating, via a data network, suitable signals between a computing system that includes the non-transitory computer-readable medium and a computing system that includes the processing device.

At block 604, the process 600 involves identifying a loss likelihood of the word generation model 104 including a log likelihood loss and a return loss. One or more processing devices execute the word generation model 104 (or other suitable program code) to implement block 604. For instance, executing the word generation model 104 involves using a reinforcement learning formulation that aids in tuning global qualitative characteristics that are measurable using various metrics. The loss of the word generation model 104 is represented with the following equation:

$$\text{Loss} = \alpha \cdot L_{nll} + \beta \cdot L_{rl} \qquad \text{(Equation 5)}$$

where $L_{nll}$ is the normal log likelihood loss, which is used in optimizing sequence-to-sequence models, and $L_{rl}$ is the return loss optimized using a policy gradient algorithm. In an example, the return loss is represented with the following equation:

$$L_{rl} = [r(\hat{y}) - r(y^s)] \Sigma_{t=1}^n \log p(y_t^s | y_1^s, \ldots, y_{t-1}^s, x) \qquad \text{(Equation 6)}$$

where the log term is a log likelihood on sampled sequences, and the difference term is a difference between the reward (e.g., a readability metric) for a greedily sampled sequence (e.g., a baseline) and multinomially sampled sequences. In an example, the formulation is flexible and does not require the metric to be differentiable.

At block 606, the process 600 involves training the word generation model 104 using end-to-end training to reduce word generation model loss. One or more processing devices execute the word generation model 104 (or other suitable program code) to implement block 606. In an example, the word generation model 104 is executed to perform the end-to-end training involving using the training data to minimize or otherwise reduce the model loss of Equation 5. By minimizing or otherwise reducing the model loss of Equation 5, the word generation model 104 is trained to generate the tuned summary 102 that is tuned to the targeted qualitative characteristics with minimal loss.

Figure 7:
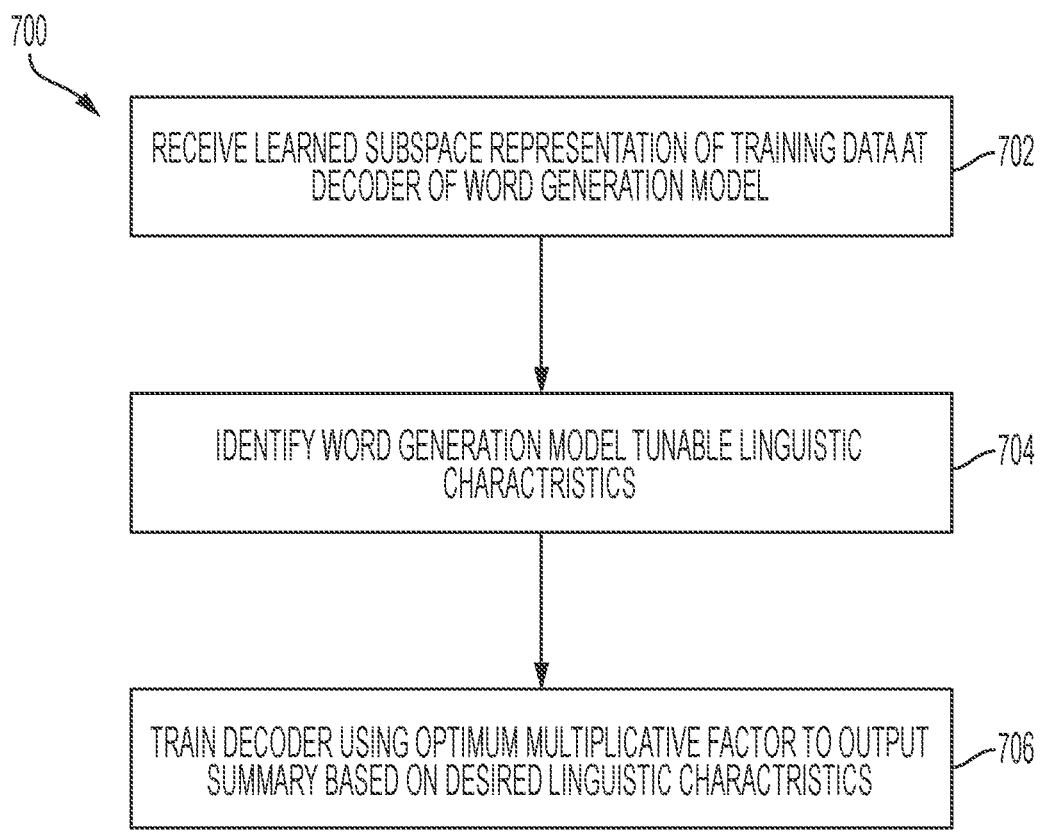
FIG. 7 depicts an example of a process for training a decoder of the word generation model of FIG. 1 to output a summary based on desired linguistic characteristics, according to certain embodiments of the present disclosure.

FIG. 7 is an example of a process 700 for training the convolutional decoder 114 of the word generation model 104 to output the tuned summary 102 based on targeted linguistic characteristics. Some classes of characteristics that are targeted by the word generation model 104 are independent of the input text 110. For example, these targeted characteristics are directed toward making the tuned summary 102 more descriptive, making the tuned summary 102 include simpler content, or tuning the tuned summary 102 toward other linguistic characteristics. To tune the tuned summary 102 to the linguistic characteristics, the generation probabilities of desirable alternatives (e.g., that can improve a target characteristic) are boosted at the convolutional decoder 114 using an optimum multiplicative factor (or factors while using the distribution).

At block 702, the process 700 involves receiving the learned subspace representation 108 of the training data at the convolutional decoder 114 of the word generation model 104. One or more processing devices execute the word generation model 104 (or other suitable program code) to implement block 702. For instance, executing the word generation model 104 causes one or more processing devices to receive or otherwise access the learned subspace representation 108 that is stored in a non-transitory computer-readable medium. In some embodiments, receiving or accessing the learned subspace representation 108 involves communicating, via a data bus, suitable signals between a local non-transitory computer-readable medium and the processing device. In additional or alternative embodiments, receiving or accessing the learned subspace representation 108 involves communicating, via a data network, suitable signals between a computing system that includes the non-transitory computer-readable medium and a computing system that includes the processing device.

At block 704, the process 700 involves identifying tunable linguistic characteristics of the word generation model 104. One or more processing devices execute the word generation model 104 (or other suitable program code) to implement block 704. For instance, the word generation model 104 may include a number of linguistic characteristics to which the tuned summary 102 is tunable. By identifying the tunable linguistic characteristics, a user is able to determine which tunable linguistic characteristics are the most applicable to the desired tuned summary 102.

At block 706, the process 700 involves training the convolutional decoder 114 using an optimum multiplicative factor to output the tuned summary 102 that is tuned to the desired tunable linguistic characteristics. One or more processing devices execute the word generation model 104 (or other suitable program code) to implement block 706. For instance, executing the word generation model 104 involves using an updated word generation probability for each word $w_j$ in a vocabulary of the input text 110 or the training data. The updated probability is represented with the following equation:

$$p'_j(y_{i+1} | y_i, \ldots, y_1, x) = \frac{p_j(y_{i+1} | y_i, \ldots, y_1, x) * (1 + \delta_j)}{Z} \qquad \text{(Equation 7)}$$

where $\delta_j$ is the multiplicative factor and Z is a re-normalization factor. In an example, $\delta_j$ may either be the same or different words in the vocabulary. While making the tuned summary 102 simple, for example, the generation probabilities of simpler words are boosted proportional to the presence of the simpler words in a simple lexicon. As with the content-based target characteristic tuning, a level of boosting is trained by the word generation model 104 such that the boosting does not reduce coherence of the tuned summary 102 while still achieving the targeted tunable linguistic characteristics.

Example of a Computing System for Executing a Searchable Tag Identifier Module

Figure 8:
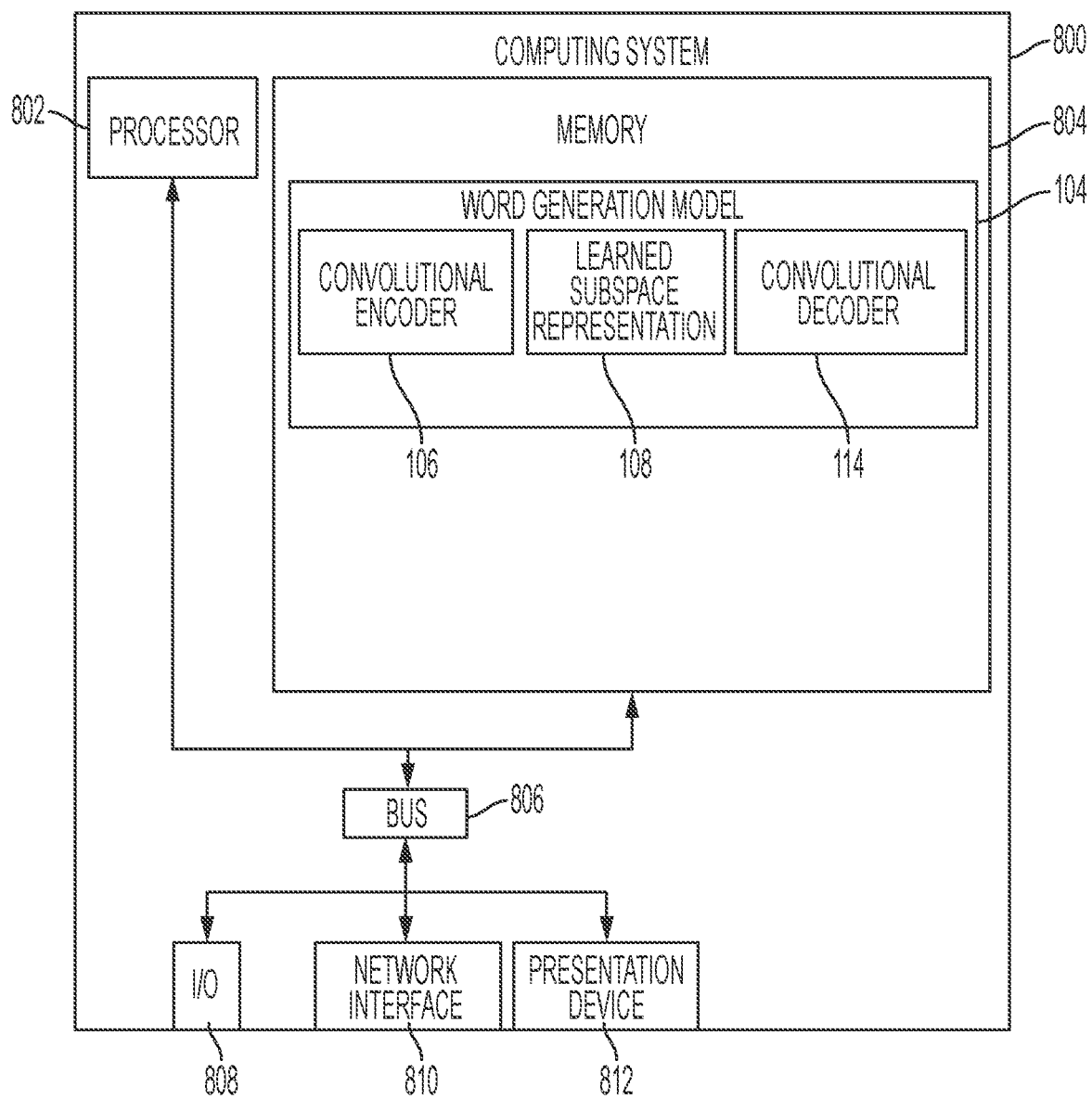
FIG. 8 depicts an example of a computing system for performing various operations described herein, according to certain embodiments of the present disclosure.

Any suitable computing system or group of computing systems can be used for performing the operations described herein. FIG. 8 depicts an example of a computing system 800 for performing various operations described herein, according to certain embodiments of the present disclosure. In some embodiments, the computing system 800 executes the word generation model 104, as depicted in FIG. 8. In other embodiments, separate computing systems having devices similar to those depicted in FIG. 8 (e.g., a processor, a memory, etc.) separately execute the word generation model 104.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the word generation model 104, the convolutional encoder 106, the learned subspace representation 108, the convolutional decoder 114, or other suitable applications that perform one or more operations described herein. The program code may be resident in the memory device 804 or any suitable computer-readable medium and may be executed by the processor 802 or any other suitable processor. In additional or alternative embodiments, the program code described above is stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via a data network using the network interface device 810.

In some embodiments, the computing system 800 also includes the presentation device 812. A presentation device 812 can include any device or group of devices suitable for providing visual, auditory, or other suitable sensory output. Non-limiting examples of the presentation device 812 include a touchscreen, a monitor, a speaker, a separate mobile computing device, etc. In some aspects, the presentation device 812 can include a remote client-computing device that communicates with the computing system 800 using one or more data networks described herein. Other aspects can omit the presentation device 812.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating a tuned summary using a word generation model, wherein the method includes one or more processing devices performing operations comprising:
   prepending a training token to a set of ground truth text to generate training data;
   receiving the training data at the word generation model;
   training the word generation model using the training data, the training token, and a ground truth summary;
   generating a learned subspace representation of input text and a target characteristic token associated with the input text by applying an encoder of the word generation model to the input text and the target characteristic token; and
   generating, by a decoder of the word generation model, each word of a tuned summary of the input text from the learned subspace representation and from a feedback about preceding words of the tuned summary, wherein the tuned summary is tuned to target characteristics represented by the target characteristic token.

2. The method of claim 1, wherein training the word generation model enables tuning of the tuned summary to a set of structural target characteristics, a set of content based target characteristics, a set of qualitative target characteristics, a set of linguistic target characteristics, or any combination thereof.

3. The method of claim 1, wherein generating the tuned summary comprises generating the tuned summary in a word-by-word manner.

4. The method of claim 1, wherein the one or more processing devices perform operations further comprising:
   receiving, at the encoder, the training data;
   modifying a focus of attention at an attention distribution block of the word generation model using a hyperparameter; and
   training the word generation model using end-to-end training with the training data and the hyperparameter.

5. The method of claim 1, wherein the one or more processing devices perform operations further comprising:
   receiving, at the encoder, the training data;
   identifying word generation model loss comprising log likelihood loss and return loss; and
   training the word generation model using end-to-end training to reduce the word generation model loss.

6. The method of claim 1, wherein the one or more processing devices perform operations further comprising:
   receiving, at the decoder, a training data learned subspace representation of the training data;
   identifying tunable linguistic characteristics of the word generation model; and
   training the decoder using an optimum multiplicative factor to output a training tuned summary of the training data learned subspace representation based on at least one of the tunable linguistic characteristics.

7. The method of claim 1, wherein the one or more processing devices perform operations further comprising:
   increasing focus, by an attention distribution block, on portions of the input text that are relevant to the target characteristics represented by the target characteristic token prior to generating the tuned summary.

8. A computing system comprising:
   means for receiving, at an encoder of a word generation model, training data;
   means for identifying word generation model loss comprising log likelihood loss and return loss;
   means for training the word generation model using end-to-end training to reduce the word generation model loss;
   means for generating a learned subspace representation of input text and a target characteristic token associated with the input text by applying the encoder to the input text and the target characteristic token; and
   means for generating, by a decoder of the word generation model, each word of a tuned summary of the input text from the learned subspace representation and from a feedback about preceding words of the tuned summary, wherein the tuned summary is tuned to target characteristics represented by the target characteristic token.

9. The computing system of claim 8, further comprising:
   means for increasing focus, by an attention distribution block, on portions of the input text that are relevant to the target characteristics represented by the target characteristic token prior to generating the tuned summary.

10. The computing system of claim 8, wherein training the word generation model enables tuning of the tuned summary to a set of structural target characteristics, a set of content based target characteristics, a set of qualitative target characteristics, a set of linguistic target characteristics, or any combination thereof.

11. The computing system of claim 8, further comprising:
    means for prepending a training token to a set of ground truth text to generate the training data; and
    means for training the word generation model using the training data, the training token, and a ground truth summary.

12. The computing system of claim 8, further comprising:
    means for modifying a focus of attention at an attention distribution block of a word generation model using a hyperparameter; and
    means for training the word generation model using end-to-end training with the training data and the hyperparameter.

13. The computing system of claim 8, further comprising:
    means for receiving, at the decoder, a training data learned subspace representation of the training data;
    means for identifying tunable linguistic characteristics of the word generation model; and
    means for training the decoder using an optimum multiplicative factor to output a training tuned summary of the training data learned subspace representation based on at least one of the tunable linguistic characteristics.

14. A non-transitory computer-readable medium having instructions stored thereon, the instructions executable by a processing device to perform operations comprising:
    receiving, at an encoder of a word generation model, training data;
    modifying a focus of attention at an attention distribution block of the word generation model using a hyperparameter;
    training the word generation model using end-to-end training with the training data and the hyperparameter;
    generating a learned subspace representation of input text and a target characteristic token associated with the input text by applying the encoder to the input text and the target characteristic token; and
    generating, by a decoder of the word generation model, each word of a tuned summary of the input text from the learned subspace representation and from a feedback about preceding words of the tuned summary, wherein the tuned summary is tuned to target characteristics represented by the target characteristic token.

15. The non-transitory computer-readable medium of claim 14, wherein generating the tuned summary comprises generating the tuned summary in a word-by-word manner.

16. The non-transitory computer-readable medium of claim 14, the instructions further executable by the processing device perform operations comprising:
    prepending a training token to a set of ground truth text to generate the training data; and
    training the word generation model using the training data, the training token, and a ground truth summary.

17. The non-transitory computer-readable medium of claim 14, wherein training the word generation model enables tuning of the tuned summary to a set of structural target characteristics, a set of content based target characteristics, a set of qualitative target characteristics, a set of linguistic target characteristics, or any combination thereof.

* * * * *